G. W. SLATER.
DRIVING MECHANISM.
APPLICATION FILED OCT. 5, 1911.
1,017,923.
Patented Feb. 20, 1912.
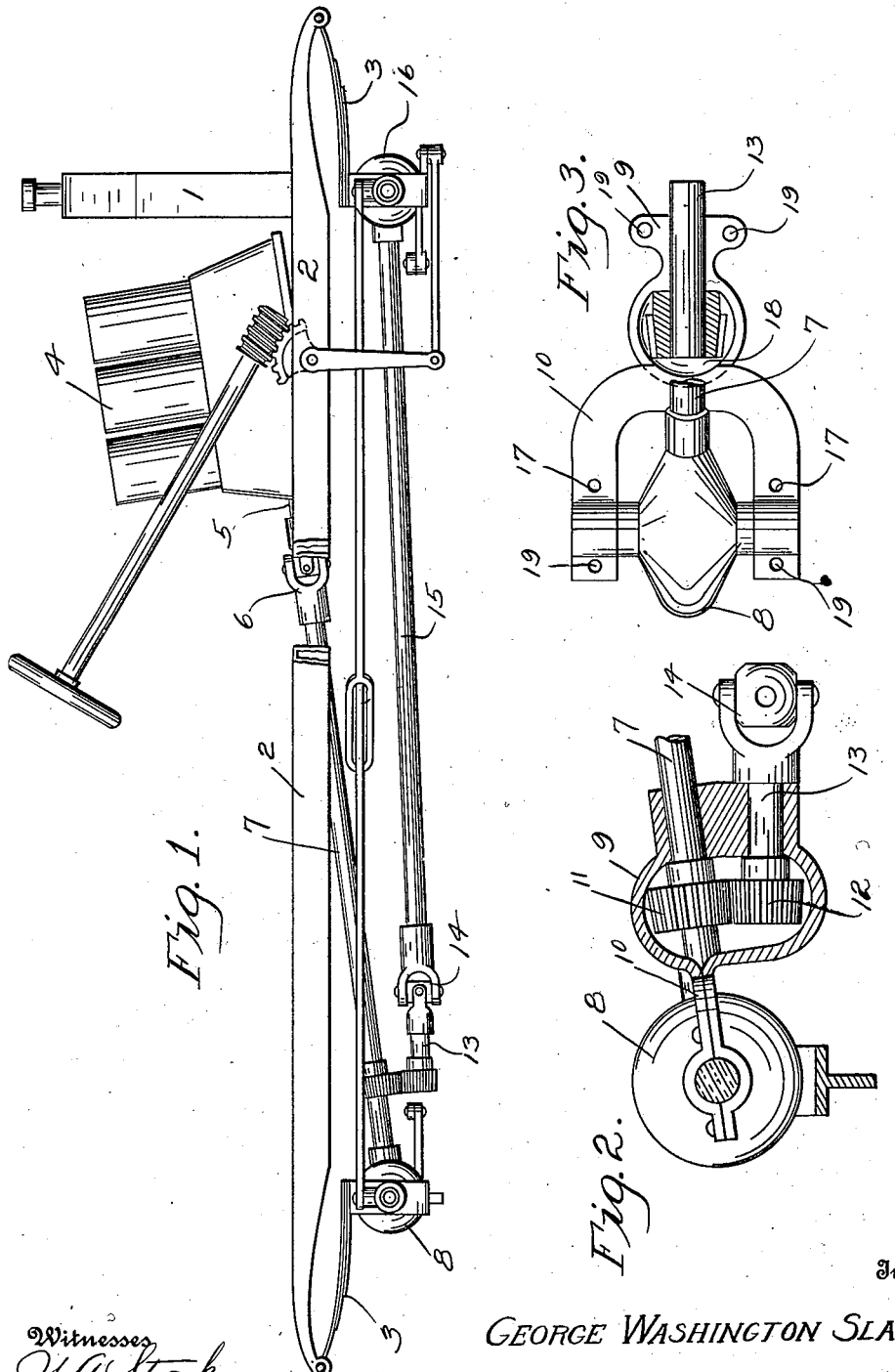
Witnesses
H. A. Stock
F. P. Schroeder.
Inventor
GEORGE WASHINGTON SLATER
By Harry C. Schroeder
his Attorney

UNITED STATES PATENT OFFICE.

GEORGE WASHINGTON SLATER, OF OAKLAND, CALIFORNIA.

DRIVING MECHANISM.

1,017,923.  Specification of Letters Patent.  Patented Feb. 20, 1912.

Original application filed November 17, 1910, Serial No. 592,899. Divided and this application filed October 5, 1911. Serial No. 653,037.

*To all whom it may concern:*

Be it known that I, GEORGE WASHINGTON SLATER, a citizen of the United States, residing at Oakland, in the county of Alameda and State of California, have invented certain new and useful Improvements in Driving Mechanism, of which the following is a specification.

This invention relates to motor vehicles and the principal object of the same is to provide simple and efficient driving means therefor which will apply the power equally to the front and rear axle.

Another object of this invention is the production of a simple and efficient casting or casing acting as a shield for the driving gears.

This application is a divisional application, the original application of which was filed by me on November 17, 1910, Serial No. 592,899.

Other objects and advantages of this invention will appear in the following specification and claims.

In the drawings, Figure 1 is a view in side elevation of the motor truck. Fig. 2 is a vertical section taken through the center of the gear casing. Fig. 3 is a top plan view partly in section of the structure shown in Fig. 2.

Referring to the accompanying drawings by numerals, it will be seen that the improved motor vehicle comprises a body 1 which is supported by the side bars 2, being connected to the transversely arranged axle frames by means of springs 3. An engine 4 is carried by the body 1 and carries a drive shaft 5 which is provided with a universal joint 6 connecting the shaft 5 with the drive shaft 7. The drive shaft extends into a gear housing 8 which is carried by the rear axle of the vehicle and operates the usual gearing (not shown) for driving the rear axle. The drive shaft 7 also passes through a shield housing 9 which housing is supported by brackets 10 projecting from the rear axle. Within the housing 9 the shaft 5 carries a gear 11 which gear meshes with a gear 12 carried by an auxiliary shaft 13 which shaft is also journaled in the housing 9. The forward end of the shaft 13 projects beyond the housing 9 and carries a knuckle connection 14 with a drive shaft 15. This drive shaft 15 extends into a gear housing 16 carried by the front axle and operates the usual gearing (not shown) for driving said front axle.

The described arrangement of shafts obviously applies the power equally to the front and rear axles, and the universal joint connection, permit the necessary relative movements of said shafts to compensate for shocks and jars and the change of position incidental to the turns made by the vehicle.

As will be seen, by giving the drawing careful consideration, the shield housing 9 comprises an upper and lower section substantially U-shaped at its rear end for allowing the same to straddle the gear housing thereby constituting legs 17. Each of the sections is provided with a socket 18 into which fits the gears 11 and 12 and these sections are brought together and securely held in their proper position by means of bolts passing through apertures 19.

What is claimed is:—

1. A shield housing to be used in connection with a motor vehicle, comprising a pair of sections, each section being provided with a pair of legs adapted to straddle the axle of a vehicle for supporting said sections in engagement with the axle, each of said sections being provided with a socket portion, a drive shaft passing through one of said sections of said housing and a gear thereon, said gear fitting in said socket formed in one of said sections, an auxiliary shaft passing through the other of said sections of said housing and a gear thereon fitting in said socket and meshing with said first-mentioned gear, and means for securing said sections together.

2. A device of the class described comprising a main drive shaft, an auxiliary drive shaft, a sectional housing, a gear carried by each shaft and meshing with each other, said housing being provided with sockets for receiving said gears and having a substantially U-shaped end for straddling the drive casing carried by the axle of a vehicle, whereby the main shaft and auxiliary shaft may be held in correct relation with the drive casing.

In testimony whereof I affix my signature in presence of two witnesses.

GEORGE WASHINGTON SLATER.

Witnesses:
F. P. SCHROEDER,
W. A. STOCK.